United States Patent [19]

Slaninka et al.

[11] Patent Number: 5,081,669
[45] Date of Patent: Jan. 14, 1992

[54] ASSIGNABLE SPEAKERS FOR CHANNELS AT A TRUNKED CONSOLE OPERATOR POSITION

[75] Inventors: Laura L. Slaninka, Streamwood; Jeffrey J. Blanchette, Hoffman Estates, both of Ill.

[73] Assignee: Motorola, Inc., Schaumburg, Ill.

[21] Appl. No.: 572,928

[22] Filed: Aug. 27, 1990

[51] Int. Cl.[5] .............................. H04B 7/00
[52] U.S. Cl. .................... 379/56; 455/149; 455/230; 455/4
[58] Field of Search ............ 379/34, 58, 56; 455/149, 156, 230, 4

[56] References Cited

U.S. PATENT DOCUMENTS 4,768,220 8/1988 Yoshihara et al. ............... 379/58 X
4,797,949 1/1989 Stites ............................. 455/230

Primary Examiner—Stafford D. Schreyer
Attorney, Agent, or Firm—Jon P. Christensen

[57] ABSTRACT

A console speaker assignment system that is self-prompting and which allows speaker assignment to be changed without interrupting the reception of audio signals or without interrupting normal console operation.

8 Claims, 5 Drawing Sheets

ASSIGNABLE SPEAKERS FOR CHANNELS AT A TRUNKED CONSOLE OPERATOR POSITION

TECHNICAL FIELD

This invention relates generally to the field of communication systems and more specifically to communication control consoles.

BACKGROUND OF THE INVENTION

Land Mobile communication systems are known. Such systems typically consist of a plurality of mobile communication units, a plurality of repeaters, a communication resource allocator, and a plurality of communication consoles. Each communication console is constructed to participate in at least some communication transactions between communication units. The communication resource allocator provides the communication resources to facilitate such participation.

A important factor in the utility of console operation is an ability on the part of the communication resource allocator to recognize selected communication transactions and to transceive those transactions to an at least one console assigned to participate in those transactions. The transactions in which a particular console may participate are typically any transaction involving a communication unit within a particular communication group (talk-group). A communication group may comprise any communication unit involved in carrying out selected organizational, or otherwise related activity.

Operation of a conventional land mobile communication system (FIG. 1) and that of a trunked land mobile communication system (FIG. 2) are similar. Console operation and the console interface with the communication resource allocator within the two systems are substantially identical.

A communication resource allocator in a conventional system recognizes talk-groups based on the repeater from which the transaction originates. The repeater, in turn, is connected to a base interface module (BIM) within the communication resource allocator. The BIM may act as a signal receiver or a signal source. As a signal receiver the BIM receives the signal from the associated repeater, converts the signal into a digitized signal, and sources the signal into a slot on a TDM bus within the communication resource allocator.

The BIM may also act as a source of signal to the associated repeater by receiving signals from a slot on the TDM bus and transmitting the signal through the associated repeater to a communication unit serviced from the repeater. An example of a situation where a BIM can act as both a receiver and a source of signals is where two communication units are part of the same talk-group, but serviced from two separate repeaters or where a communication unit, serviced through a repeater, communicates with an console operator. In either case a signal from a first communication unit is received by a first repeater, inserted into a time slot on the TDM bus, and received by a second repeater for re-transmission to a second communication unit or received at a console by a console operator.

The slots on the TDM bus used by a repeater to source and receive signals are fixed during start-up of the repeater. Once inserted into a slot on the TDM bus, signals may be transceived with the TDM bus by a console through an interface with the communication resource allocator consisting of a operator interface mux module (OMI) and an audio expansion interface module (AEI). (For an operational description of the TDM bus and slot location, refer to Motorola Inc., Pub. No. R4-2-37C, CENTRACOM Series II Control Centers (March, 1988).)

Exchange of signals between a console and the TDM bus is performed by the AEI and OMI under the control of the OMI. The OMI contains, in personality firmware located within the OMI, information relative to certain supervisory functions controlled from the OMI for the console. (For a detailed description of and a list of supervisory functions, refer to Motorola, Inc. Pub. No. R4-2-73, CENTRACOM Series II Plus Control Centers (April, 1988).)

One of the supervisory functions performed by the OMI is the control of the AEI in receiving audio signals from slots on the TDM bus. By design the personality firmware within the OMI contains the IDs and time slots of specific talk-groups. The OMI provides timing control to the AEI for purposes of receiving the audio signals from specific slots and routing the signals to specific speakers.

Another supervisory function performed by the OMI is the transmission of audio signals from a console operator to a destination talk-group. The console operator first activates a "talk" button on a channel control module (CCM) within the console and then speaks into a microphone located on the console. The activation of the pushbutton alerts the OMI as to which talk-group the transmission is intended. The OMI, under control of the personality firmware, inserts the outgoing signal into an appropriate slot on the TDM bus.

Together the AEI and OMI under control of the OMI transceive signals between the TDM bus and the console. Audio signals from communication units (talk-groups) are routed as specified within the OMI by the AEI to the designated speaker for the talk-group within the console. Outgoing audio signals from the console are inserted into appropriate TDM slots on the TDM bus for transmission to communication units within a talk-group.

Contained within the console is a CCM for each talk-group. Identification of the talk-group associated with a specific CCM located within a console is defined in the personality firmware of the OMI. The CCM, in turn, interfaces directly with the OMI. The CCM through activation of a talk button located on the CCM thereby identifies through the OMI the destination talk-group for outgoing audio signals. The CCM also allows a console operator to control such talk-group parameters as audio volume and designated speaker, all under control of the OMI. The CCM, typically, allows a first designated speaker for non-priority monitoring and a second designated speaker for priority monitoring. Activation of a priority monitoring pushbutton on the CCM causes the AEI to route an audio signal to the second designated speaker for priority monitoring as designated within the OMI.

Typically, consoles contain more CCMs than speakers. Fewer speakers are needed because while only one talk-group may be assigned to a CCM, a number of audio signals from specific talk-groups, each controlled by a CCM, may be assigned to a speaker. The mixing of audio signals is controlled within the AEI, again, under the direct control of the OMI.

The number of talk-groups assigned to a console is typically limited by the number of CCMs contained within the console. As mentioned each CCM controls communication transactions between a specific talk-group and the console. Reassignment of a CCM, on the other hand, may be performed by a computer aided dispatcher (CAD) associated with the communication system or by a console operator. Reassignment of a CCM allows a console to participate in communication transactions with a different talk-group (at the expense of losing participation in original talk-group transactions).

Trunked mobile communication systems operate in a similar manner to the conventional system. One difference is that while in a conventional system the OMI is programmed to identify talk-groups by slot location, the OMI in a trunked system must be informed over a data bus of the slot location of a signal from a particular talk-group. The need for the greater sophistication in the operation of the trunked systems lies in the flexible use of repeaters.

In conventional systems talk-groups are associated with specific repeaters. In trunked systems, on the other hand, communications units request service from an available repeater. The repeater then transmits such requests for service to a communication resource central within the communication resource allocator. The communication resource allocator then identifies the talk-group within which the communication unit is a part and allocates a communication resource. The communication resource includes the TDM slot used by the repeater.

The communication resource central then transmits over a data bus the ID of the talk-group along with the ID of the signal slot used by the allocating repeater. OMIs participating in the talk-group, monitoring the TDM bus, and AEIs tune to the appropriate slots and transceive signals between the TDM bus and the console.

Talk-groups within conventional systems are defined within the OMI associated with a specific console. Changes in talk groups, consequently, may be made through a computer aided dispatcher (CAD) in contact with the OMI or through the console by a console operator. Talk-groups may be de-assigned at certain consoles and added to other consoles. Changes in the composition of talk-groups in conventional systems, on the other hand, must be made by the exchange of communication units since inclusion in a talk group is defined by the repeater servicing the talk-group.

Changes in talk-groups within trunked systems are somewhat more flexible. Inclusion within talk-groups in a trunked system is based upon the IDs of communication units within the communication resource central. Grouping of communication units into specific talk-groups is also contained within memory within the communication resource central. Changes of the composition of talk-groups, consequently, may be made from a terminal connected to the communication resource central. Assigning and deassigning talk-groups from consoles may be made in the same manner as with a conventional system.

Changes to the operation of the console, on the other hand, is somewhat more difficult. Operation of the console is controlled through the personality firmware contained within the OMI. The operator has only limited access to the personality firmware through a CRT located on a CRT Console (For an operational description of the CRT Console, refer to Motorola Inc., Pub. No. 68P81120E38-A, CENTRACOM Series II Control Centers (June 25, 1988).) or through pushbuttons and switches on a Buttons and LEDs Console (For an operational description of the Buttons and LEDs Console, refer to Motorola Inc., Pub. No. 68P81114E48-E, CENTRACOM Series II Control Centers (Nov. 30, 1988—UP).)

The instructions contained within the firmware define how the console operates. The personality firmware defines a speaker designation for priority monitoring and speaker designation for non-priority monitoring.

Changes to a console must be made by shutting down the system and loading different firmware into the OMI. Communication activity within a communication console, on the other hand, is of a dynamic nature. Levels of communications activity within a talk-group may vary hourly or even by the minute. Talk-groups assigned to one designated speaker may assume a different level of activity while another designated speaker may, simultaneously, experience a low level of activity. A need therefore exists for a way to dynamically modify speaker assignment in a more flexible manner from the console while the console is in normal operation.

SUMMARY OF THE INVENTION

Pursuant to one embodiment of this invention, assignment of audio signals to console speakers becomes part of an assignment function controlled from the communication console. The assignment function may be accessed through menu driven software for those consoles having CRTs or through displays and pushbuttons on other consoles.

For purposes of clarity, differences in audio destination relative to priority monitoring and non-priority monitoring herein shall be referred to in terms of changes in speaker designation. Changes of audio destination relative to the invention shall be referred to herein in terms of speaker assignment.

In one embodiment, for consoles having CRTs, changes in speaker assignment under priority monitoring are made through selection of an item from a menu displaying possible options relative to speaker assignment. Changes in speaker assignment for non-priority monitoring on consoles having CRTs are made in a similar manner.

In another embodiment for consoles not having a CRT (Buttons and LEDs Consoles) talk-groups are assigned to selected speakers through displays and pushbuttons. Speaker assignment is changed at the Buttons and LEDs Console by entering data through the use of a display/keypad located on the surface of the workstation. Speaker selection (for priority or non-priority monitoring) is accomplished through activation by the operator of a pushbutton mounted in a CCM located on the console. Speaker assignment is completed through activation of an "Enter" button.

In all cases, assignment of audio signals produced by a talk-group to a speaker occurs upon selection of the speaker and the CCM associated with the audio signal and activation of the software containing a speaker change routine. Upon execution of the routine, the talk-group is automatically deassigned from the previous speaker and assigned to the newly selected speaker. Because a talk-group is not de-assigned from a speaker until the talk-group is subsequently re-assigned, a talk-group is always assigned to at least one speaker.

Audio signals assigned to a speaker are mixed at the input to a speaker amplifier in an AEI located within the CEB. The output of the AEI then drives the speaker directly. Mixing the audio signal from a number of communication resources allows a number of signals to be assigned to the same speaker.

BEST MODE FOR CARRYING OUT THE INVENTION

Figure 1:
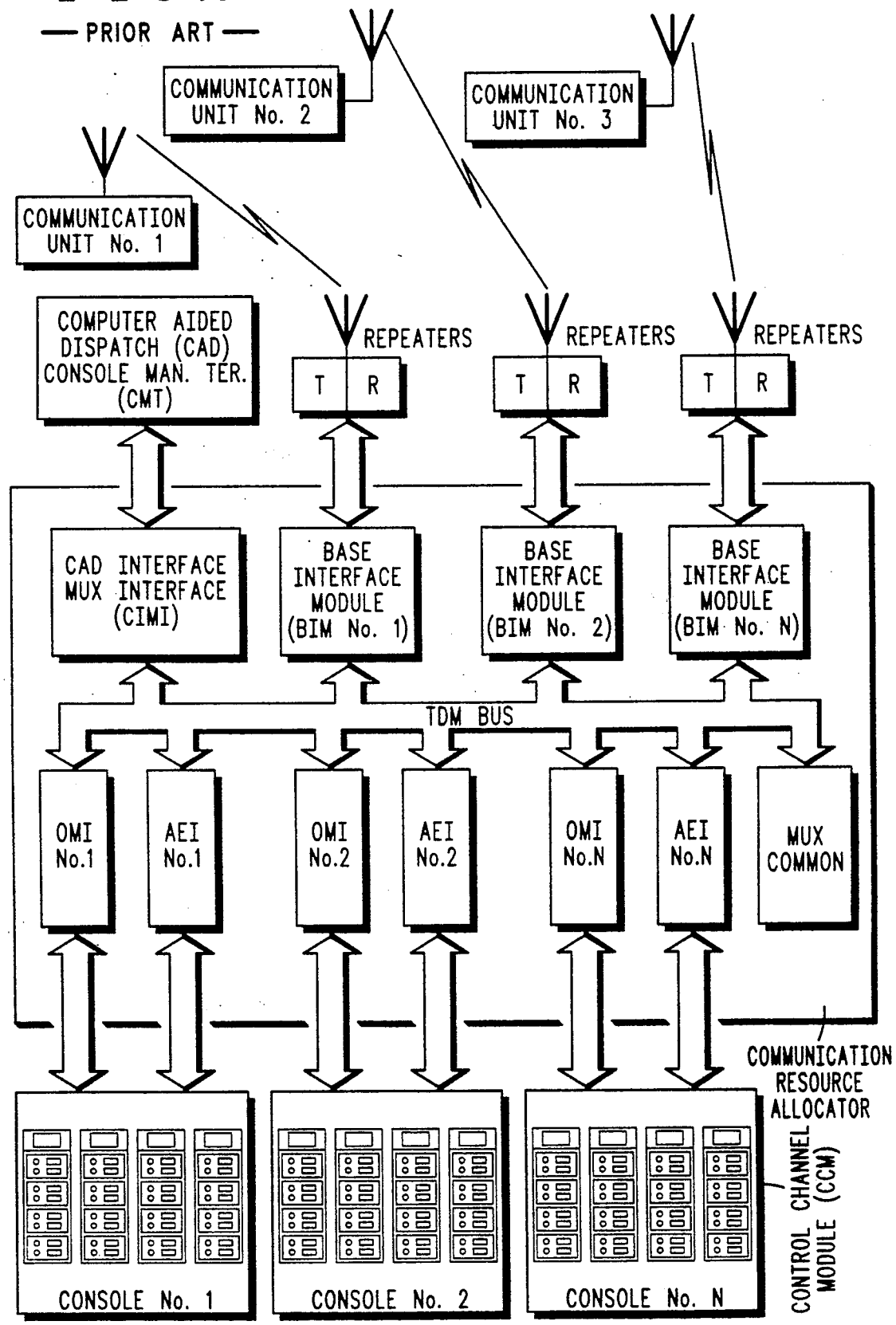
FIG. 1 comprises a depiction of a conventional land mobile communication system.
Figure 2:
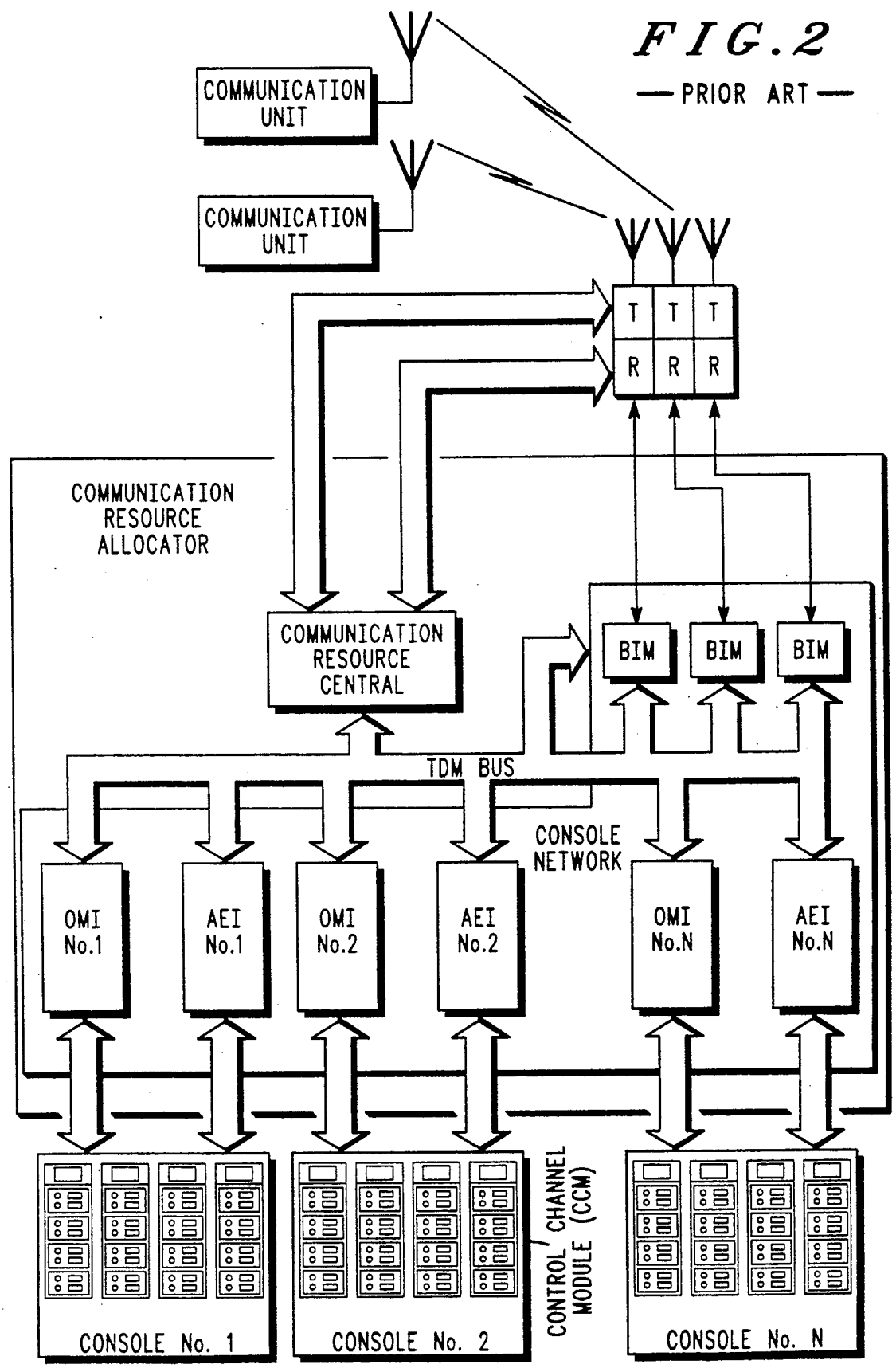
FIG. 2 comprises a depiction of a trunked land mobile communication system.
Figure 3:
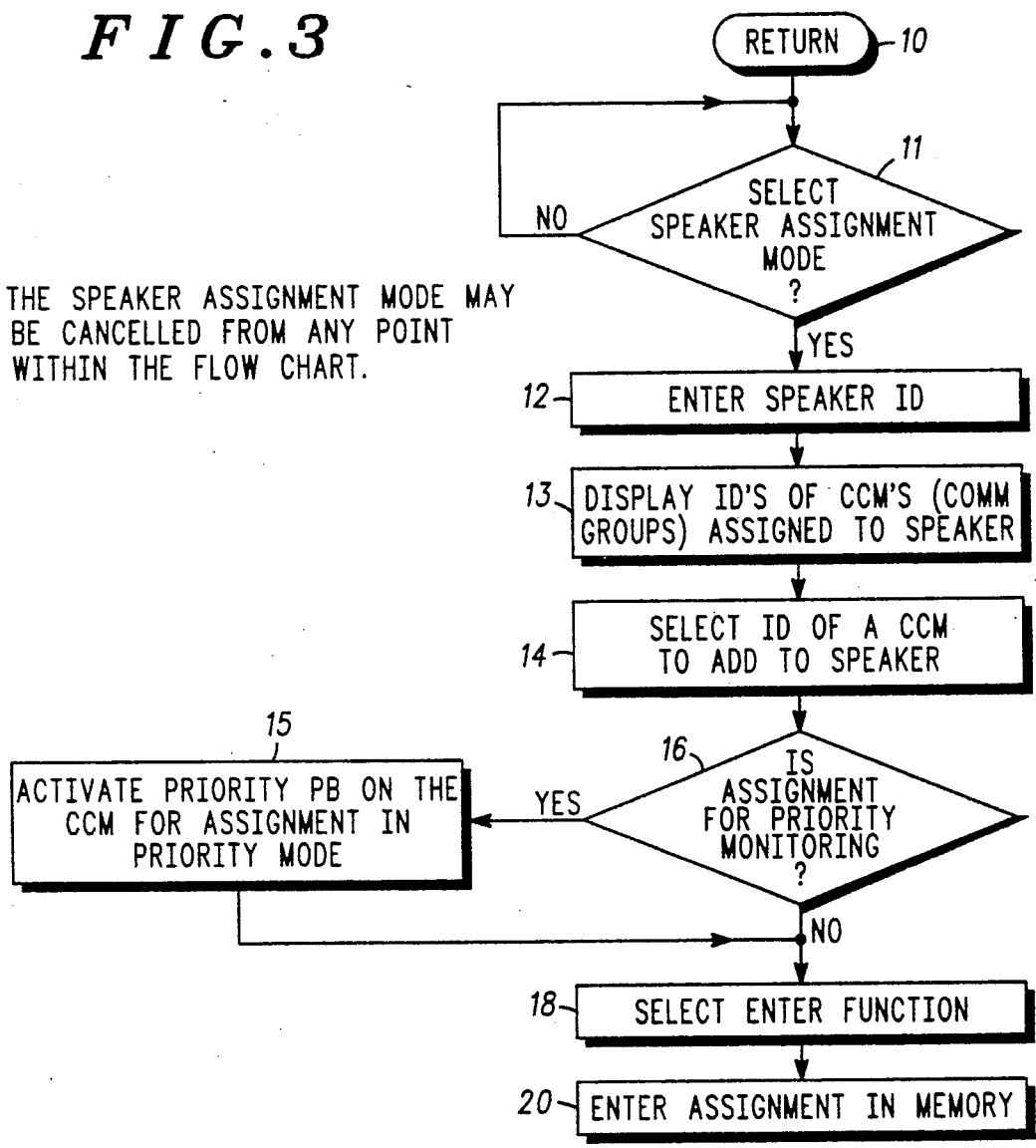
FIG. 3 comprises a depiction of a computer flow chart.

Shown in flow chart form (FIG. 3) is a representation demonstrating operation of the invention. The representation is for a computer subroutine allowing the assignment of talk-groups to speakers without shutdown or disruption of console operation. In one embodiment of the invention operation of the subroutine would be transparent to operation of the console.

Figure 4:
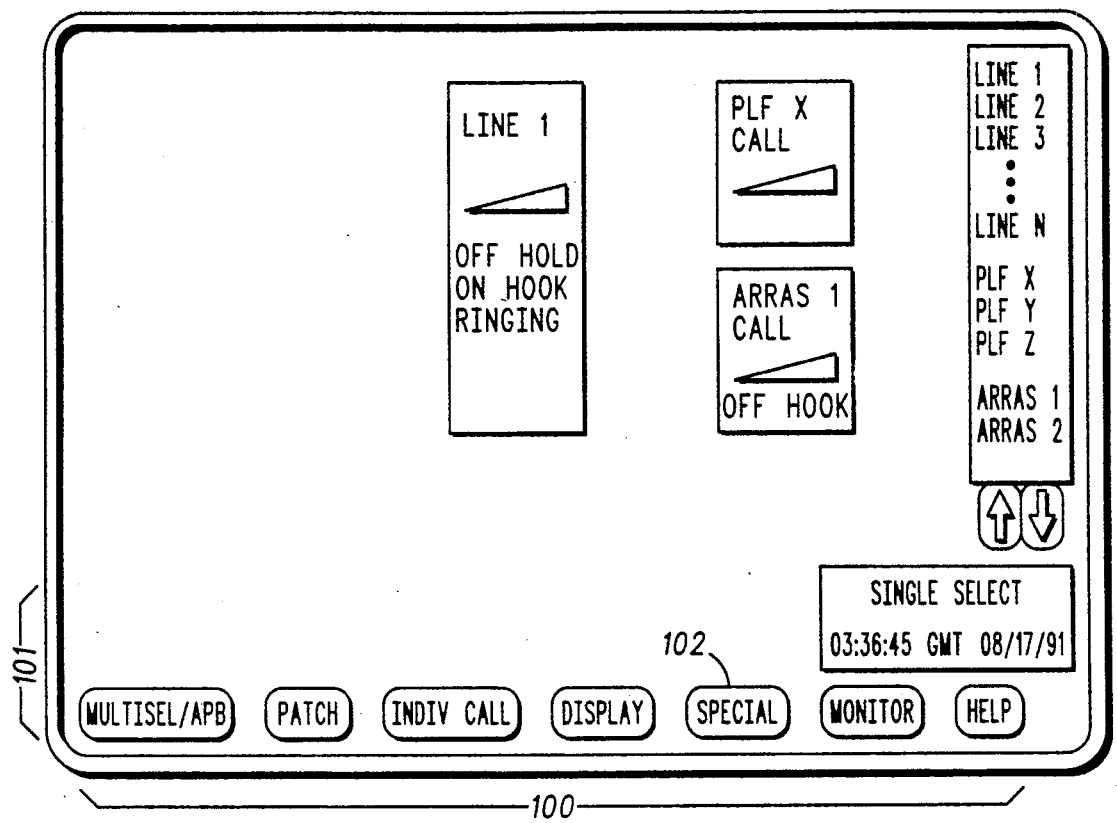
FIG. 4 comprises a depiction of a CRT screen displaying the resources available during normal console operation.
Figure 5:
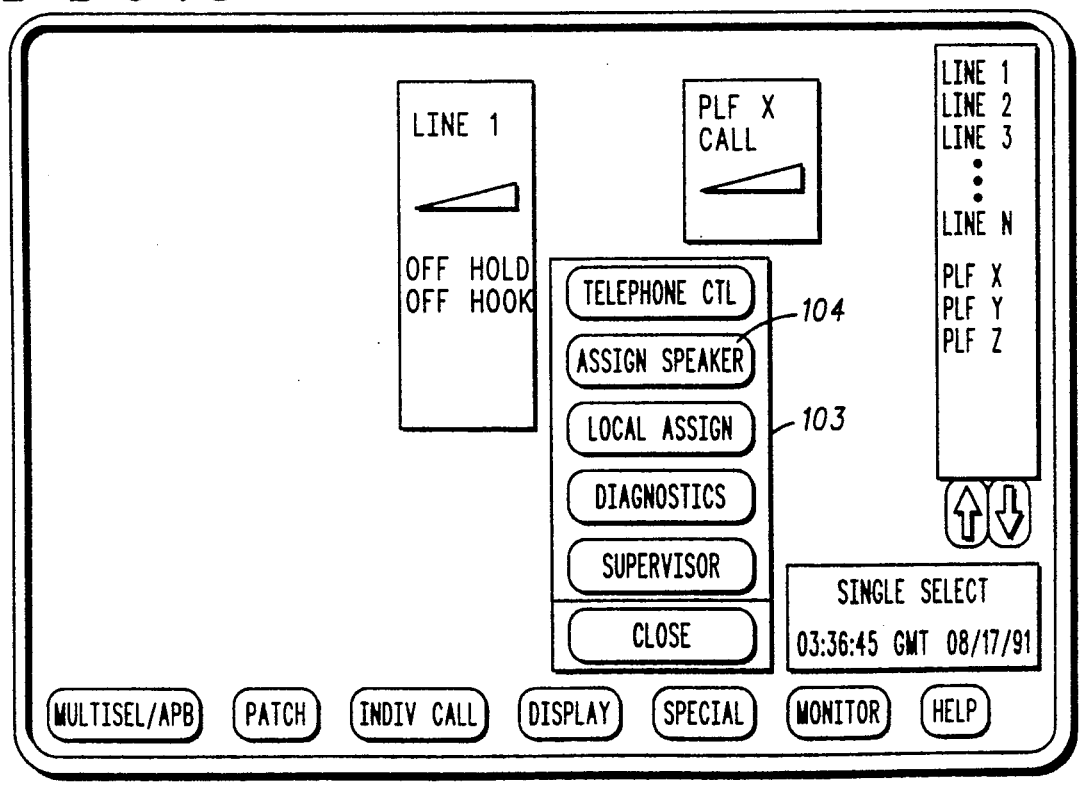
FIG. 5 comprises a depiction of a CRT screen following activation of the "Special" function.
Figure 6:
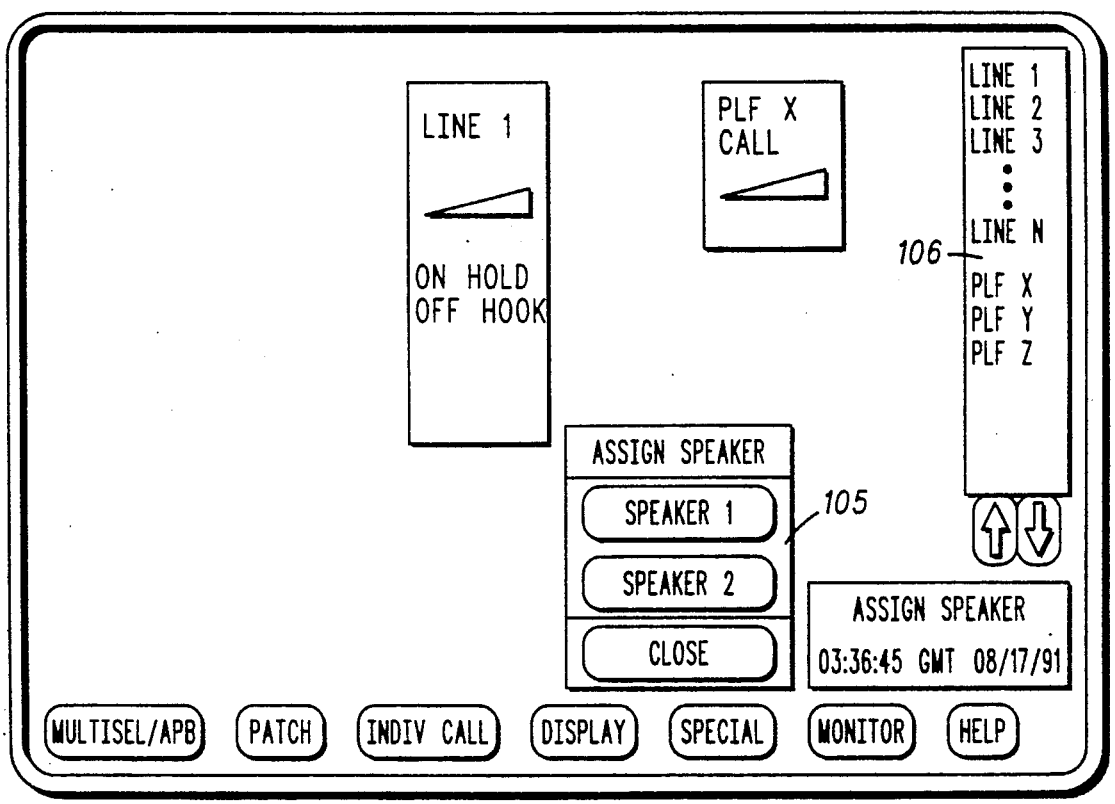
FIG. 6 comprises a depiction of a CRT screen following activation of the "Assign Speaker" function.

Referring now to one possible display on a CRT (FIG. 4) is shown a control menu for a communication control console generally (100). Available menus are shown in the menu area (101) on the lower half of the screen. To initiate a speaker assignment mode (11, FIG. 3) the operator first chooses the menu function labeled "Special" (102, FIG. 4) by moving a pointer to the chosen key and activating a switch on a mouse (not shown). Upon activation of the "Special" key (102) the menu (103) shown in FIG. 5 appears. The operator then selects the option labeled "Assign Speaker" (104) (11, FIG. 3). FIG. 6 displays the menu (105) following selection of "Assign Speaker". At the top of the box (105), displaying the heading "Assign Speaker", is shown a list of available speakers below the heading. In this example only two speakers are shown as available within the console.

Upon selection of a particular speaker (12, FIG. 3) the communication groups currently assigned to the selected speaker appear (13, FIG. 3) in the Control Window Summary List (106). To assign additional groups to a speaker the operator then selects additional group(s) (15, FIG. 3) from the Control Window Summary List (106) which then, in turn, appear. Termination of the "assign speaker" mode is accomplished through activation of the "close" key (18, FIG. 3). Selection of the group for assignment to the selected speaker automatically de-assigns the group from the speaker to which it was previously assigned.

In another embodiment of the subject invention the operator may assign a communication group to a particular speaker for monitoring from a Buttons and LEDs Console. In this instance the operator begins by pressing a button labeled "Assign Speaker" (11, FIG. 3) located in the lower right corner of the console. A display (labeled "ALPHANUMERIC KEYPAD MODULE") then prompts the operator by displaying the letters "Spr". The operator enters the number of the speaker (12, FIG. 3) through the keypad followed by activation of the "Enter" button. The communication groups (13, FIG. 3) then assigned to the selected speaker are then indicated by the automatic activation of indicating lights on the CCMs associated with the talk-groups (13, FIG. 3). The operator may then select additional communication resources for use with the selected speaker by activating the select button (15, FIG. 3) on additional channel modules. After appropriate resources are selected the operator saves the changes by again activating the button labeled "Enter" (18, FIG. 3). The operator may cancel at any point previous to this instant by activating the button labeled "Assign Speakers" while holding the button labeled "ALT". As in the previous embodiment, assignment of a group for use with the selected speaker deassigns a group from the previously selected speaker.

In the above preferred embodiment, operation of the console is determined by resident software (personality firmware). Personality firmware contains the specifics of functionality required by a user. Personality firmware may be provided to a user in a number of configurations. Personality firmware can be used to determine a designated non-priority and a priority speaker for use with specific communication groups and may be changed as described above if permitted by the personality firmware.

In certain applications personality firmware may be provided which does not allow changes in speaker assignment as has been described above. In those applications the personality firmware may allow changes but only for select communication groups. For other cases the personality firmware may specify the same speaker for priority and for non-priority monitoring and, again, may not allow changes.

In those cases where assignment of a different speaker for non-priority monitoring is permitted the system may not allow changes to the priority speaker. In cases where changes are not allowed the system will not accept entered changes and will subsequently display pre-assignment parameters.

In cases where assignment of priority and non-priority speakers is allowed the personality firmware may require that the same speaker be assigned for both designations. Other cases may designate certain speakers as non-assignable to certain talk-groups.

What is claimed is:

1. In a communication system having, at least, a plurality of communication groups and a plurality of consoles, wherein each of the plurality of consoles consists of, at least, a first and a second speaker responsive to audio signals, and a plurality of channel control modules (CCMs) that control, at least in part, the flow of audio information, and wherein at least one communication group of the plurality of communication groups is assigned to a CCM of the plurality of CCMs to produce at least one assigned communication group, a method for selecting speaker assignment of at least one audio signal generated by the at least one assigned communication group without substantially interrupting operation of the communication system, the method comprising the steps of:

a) initiating a speaker selection mode;

b) selecting audio destination for the at least one audio signal generated by the at least one assigned communication group to produce selected speaker assignment; and c) without substantially interrupting the operation of the communication system, executing the selected speaker assignment.

2. The method of claim 1 wherein speaker selection is performed through the entry of a speaker through a CRT input means located on the console.

3. The method of claim 1 wherein speaker selection is performed through the use of a keypad and pushbutton located on the console.

4. The method as in claim 1 wherein a speaker designation is entered before executing the selected speaker assignment.

5. A communication system comprising:
A) a plurality of communication groups;
B) a least one intra-group communication transaction among the plurality of communication groups;
C) a plurality of consoles each with at least a first and a second speaker responsive to audio signals for monitoring intra-group communication transactions;
D) at least one monitoring console of the plurality of consoles designated to monitor the at least one intragroup communication transaction on an assigned speaker of the at least first and second speaker;
E) memory means for storing the identity of the assigned speaker;
F) routing means, operably coupled to the memory means, for supplying an audio signal from the at least one intra-group communication transaction to the assigned speaker; and,
G) means for modifying, operably coupled to the memory means, such that the assigned speaker may be changed without interrupting the operation of the communication system.

6. The communication system of claim 5 wherein speaker selection is performed through the entry of a speaker through a CRT input means located on the console.

7. The communication system of claim 5 wherein speaker selection is performed through the use of a keypad and pushbutton located on the console.

8. The communication system of claim 5 wherein the means for modifying further containing a means for entering a speaker designation of the at least first and second speaker.

* * * * *